United States Patent [19]

Bergeron

[11] Patent Number: 4,981,100

[45] Date of Patent: Jan. 1, 1991

[54] HOUSE TRAILER AND BOAT ASSEMBLY

[76] Inventor: Jean-Luc Bergeron, 746 Fer á cheval, Sainte-Julie, Canada

[21] Appl. No.: 452,058

[22] Filed: Dec. 18, 1989

[51] Int. Cl.⁵ .............................................. B63C 13/00
[52] U.S. Cl. ...................................... 114/344; 114/61
[58] Field of Search ................. 114/344, 61, 123, 270, 114/77 R, 352, 353; 280/414.1; 296/156, 157

[56] References Cited

U.S. PATENT DOCUMENTS

| | | |
|---|---|---|
| 3,091,208 | 5/1963 | Copeland et al. |
| 3,134,991 | 6/1964 | Levinson ............................. 114/344 |
| 3,199,127 | 8/1965 | Hunter ................................. 114/344 |
| 3,308,782 | 3/1967 | Dahl . |
| 3,877,094 | 4/1975 | Kelley .................................. 114/344 |
| 3,941,074 | 3/1976 | Millerbernd . |
| 4,048,685 | 9/1977 | Gail ...................................... 1.4/344 |
| 4,716,850 | 1/1988 | Lachance . |
| 4,869,194 | 9/1989 | Cummins ............................ 1.4/344 |

FOREIGN PATENT DOCUMENTS 869427  4/1971  Canada .
1016411 8/1977  Canada .

*Primary Examiner*—Sherman Basinger
*Assistant Examiner*—Stephen P. Avila

[57] ABSTRACT

A house trailer and boat assembly with improved integration of the specific elements of the trailer and boat configurations such that in each of the house trailer and house boat configurations as few as possible of the elements of the other configurations are noticeable. This house trailer and boat assembly comprises a house trailer box defining elongated lateral apertures, elongated lateral floats pivotally stowable in the house trailer box, elongated panels covering the internally stowed floats for the travel configuration, and end floats at the opposite ends of the house trailer box, and pivotable each between its boat position and its travel position where they cooperatively define with the house trailer box a generally typical house trailer shape.

13 Claims, 4 Drawing Sheets

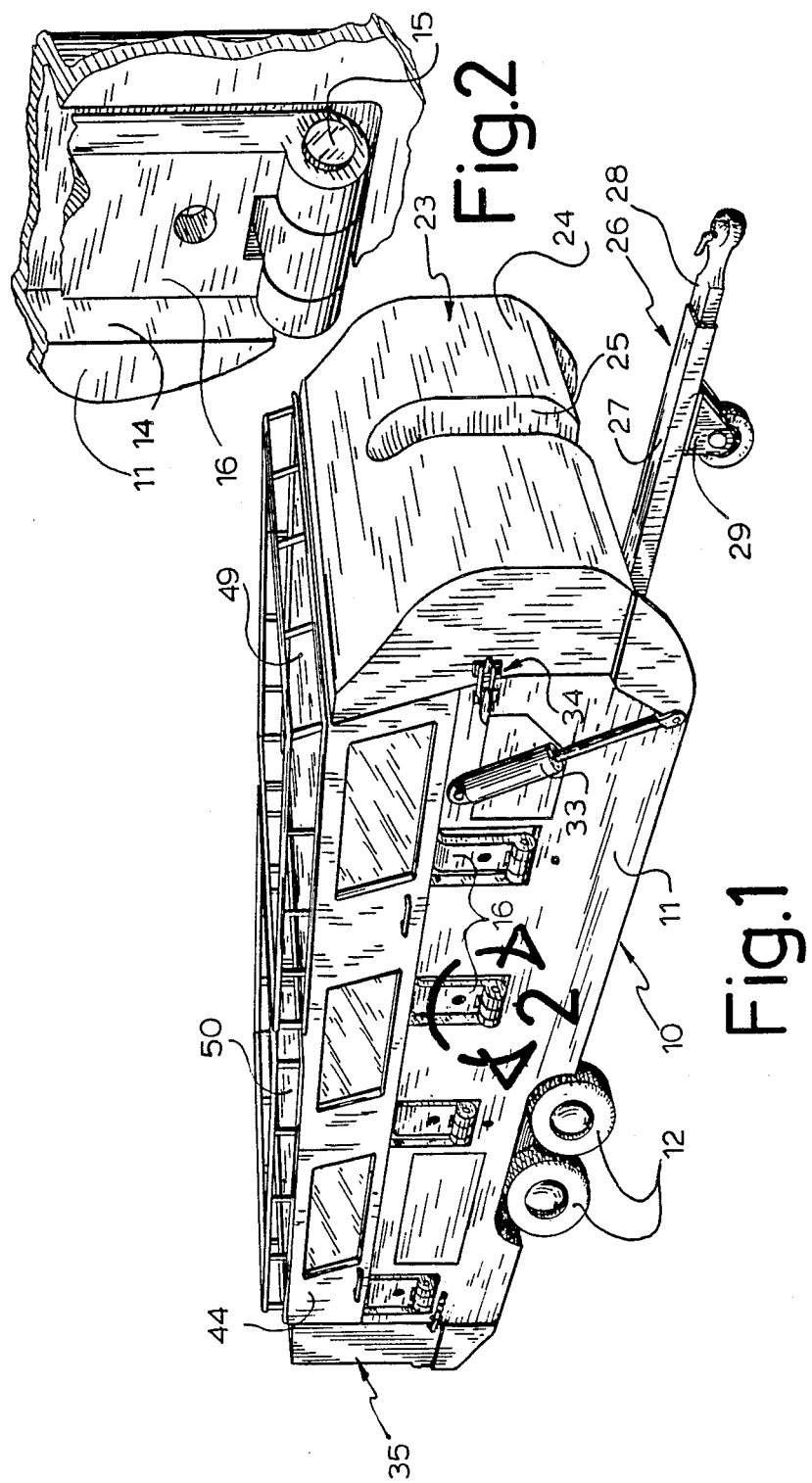

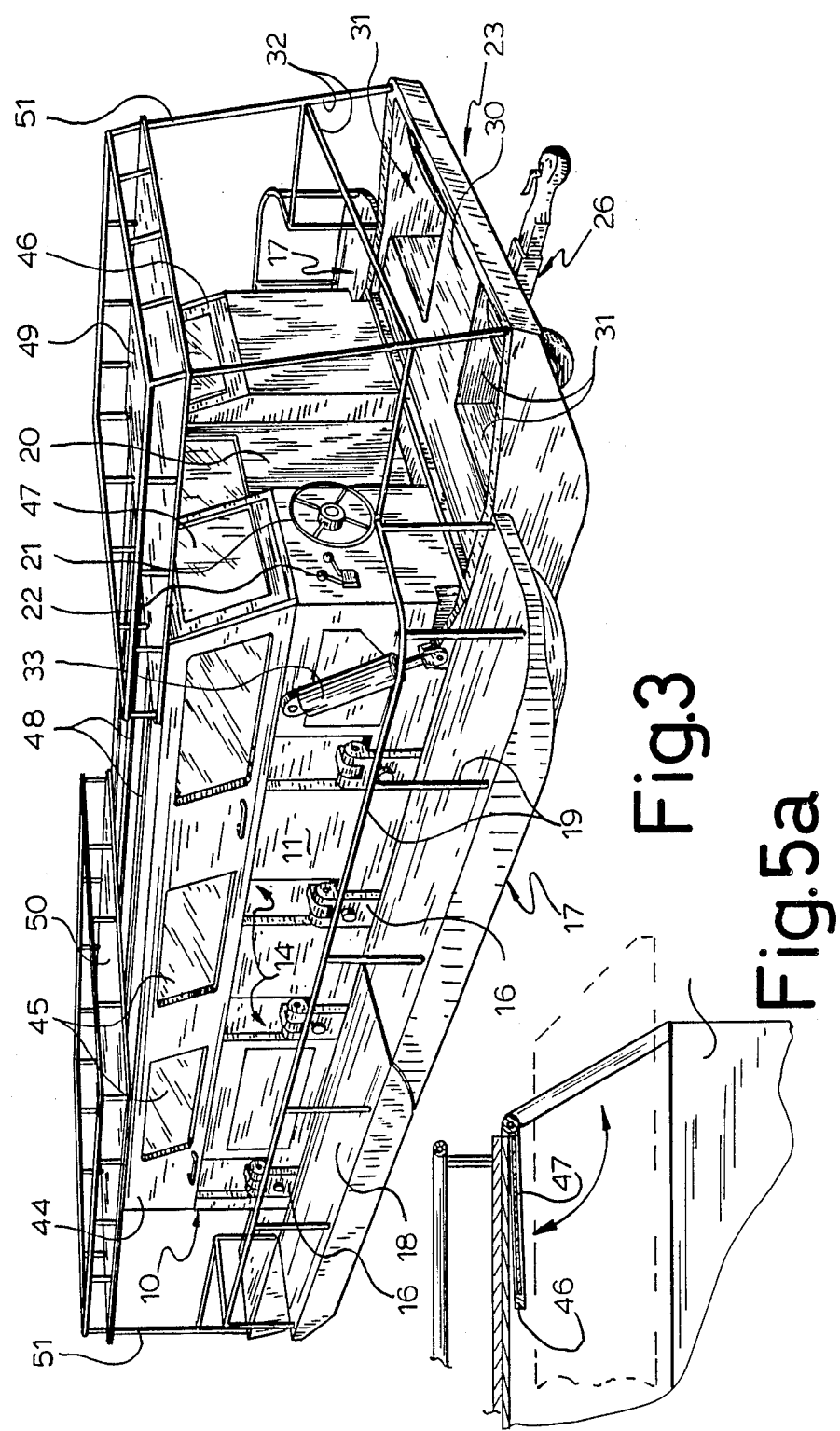

HOUSE TRAILER AND BOAT ASSEMBLY

FIELD OF THE INVENTION

This invention relates to a house trailer of the combination type forming an assembly operable either as a house trailer or a house boat.

BACKGROUND OF THE INVENTION

The comparable concepts that have been proposed so far are of generally two different types. There is what can be called the float attachement type wherein floats are merely added to an existing vehicle or trailer. The U.S. Pat. Nos. 3,308,782 and 4,802,433 are typical examples of that category. In those U.S. patents, a pair of floats are merely attached to a house trailer or the like to operatively provide the required buoyancy for the trailer for operations as a house boat and are pivotable to an elevated stowed position to travel with the trailer. Such mere attachments have the floats always externally positioned relative to the carrying vehicle and are relatively unsightly.

There is also what can be called the elongated or combination type wherein the vehicle or trailer is custom made to integrate the floats or pontoons to it. The Canadian patent 1,016,411 and the U.S. Pat. No. 3,941,074 fall in that category. In these two patents, the wheels are attached to the pontoons and pivot with them between the trailer configuration and the boat configuration. This presents difficulties since the change from one configuration to the other must be made afloat where the wheels are free to pivot with the pontoons.

OBJECTS OF THE INVENTION

The present invention is directed to the integrated type and is conceived to provide an improved integration such that in either of the boat configuration and the house trailer configuration as few as possible of the elements of the configuration are noticeable, without hampering the operation of the selected configuration and while avoiding the difficulties of converting from one configuration to the other that are associated with the wheels attached to the floats or pontoons and that pivot with the latter from one configuration to the other.

SUMMARY OF THE INVENTION

The house trailer and boat assembly according to the present invention comprises a house trailer box defining elongated lateral apertures, elongated lateral floats pivotally stowable in the house trailer box, elongated panels covering the internally stowed floats in the travel configuration, and end floats at the opposite ends of the house trailer box with each end float being pivotable between its boat and its travel positions where it cooperatively defines with the house trailer box a generally typical house trailer shape. The house trailer box also includes pivotable end panels to allow stowing of the floats in it with their opposite ends projecting fore and aft thereof and cavities in the end floats to enclose the opposite ends of the lateral floats in the stowed position.

BRIEF DESCRIPTION OF THE DRAWINGS

The above and other objects and advantages of the present invention will be better understood with reference to the accompanying drawings which illustrate, by way of example, a preferred embodiment of the invention and wherein:

FIG. 1 is a general view in perspective of a house trailer and boat assembly according to the present invention and shown in the trailer configuration;

FIG. 2 is an enlarged detailed view of a hinge taken from the position indicated by the encircling line 2 in FIG. 1;

FIG. 3 is a general view in perspective of the same house trailer and boat assembly as in FIG. 1 but now shown in the boat configuration;

FIG. 5a is a detailed view illustrating the inward pivoting of a window panel at one end of the house trailer and boat;

DETAILED DESCRIPTION OF THE INVENTION

Figure 6:
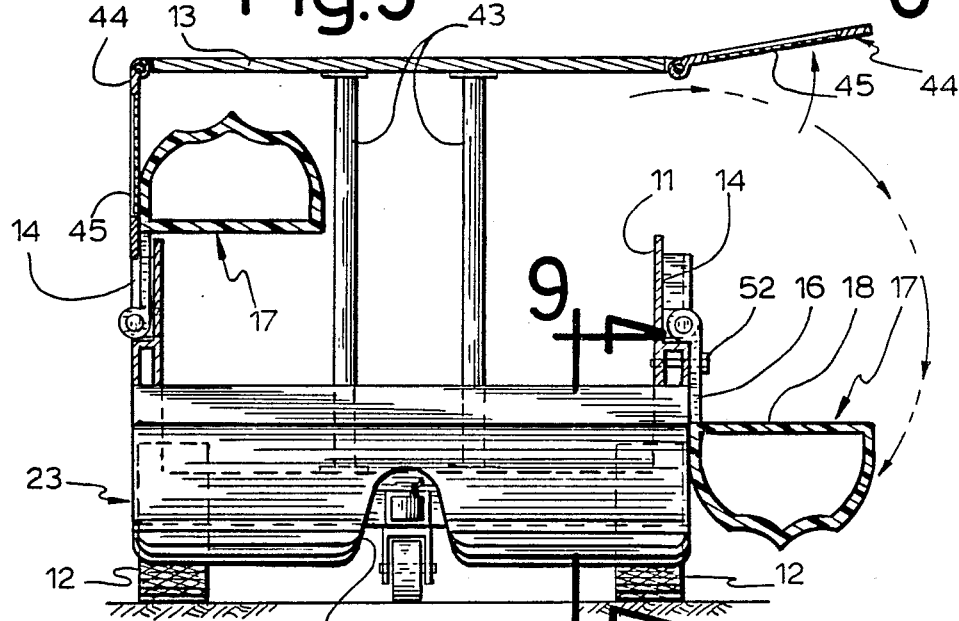
FIG. 6 is a partial cross-sectional view as seen along line 6—6 in FIG. 5.

The illustrated house and boat assembly includes a main body forming a house trailer box 10 having the general outline or shape of a typical house trailer. The house trailer box 10 has a pair of opposite lateral sides 11 and is conventionally carried on wheels 12. The lateral sides 11 upwardly extend less than the full height of the house trailer box to leave an elongated aperture along the full length of the box and under the roof 13, as best seen in FIG. 6. Each lateral side is formed with a flat recess 14. A hinge pivots in each recess 14 about a horizontal pivot 15. Each hinge includes an arm 16 which has its outer end fixed to an elongated float 17. The two lateral floats 17 are longer than the house trailer box 10 and thus project fore and aft of the same. The top of each lateral float is flat to form a lateral deck 18. A railing 19 is fixed on the lateral deck 18 along its outer periphery. The railing 19 must be collapsible or removable to allow pivotal displacement of the floats.

The front of the house trailer box 10 is formed with an end wall provided with a central door 20. Conventional house trailer controls including a steering wheel 21 and control levers 22 are conventionally mounted on the front wall.

A front float 23 is pivotally connected to the house trailer box and has as external surface that is outwardly bulging and is shaped to match the front end of the house trailer box and to give it the typical outline of the front end of a house trailer. The external surface 24 is formed with a longitudinal recess 25 that allows engagement of the draw bar 26 in it when the front float 23 is pivotally lowered to its house boat position, as shown in FIG. 3. The draw bar 26 is of telescopic construction and includes a fixed outer tube portion 27 and an internally slidable portion 28. A swivel wheel 29 steerably supports the draw bar. The internal or top surface of the front float 23 is formed with a front deck area 30 and a pair of cavities 31 that provide spaces to receive the corresponding front ends of the lateral floats when the assembly is in the house trailer configuration. A railing 32 is also collapsably or removably mounted around the outer periphery of the front float 23. A pair of hydraulic actuators 33 are provided on the opposite sides respectively of the house trailer box and are connected to the latter and to rear projections of the front floats to pivot the latter. A latch 34 is provided on each side of the house trailer box to lock the front float in its elevated house trailer position, as best shown in FIG. 1.

Figure 5:
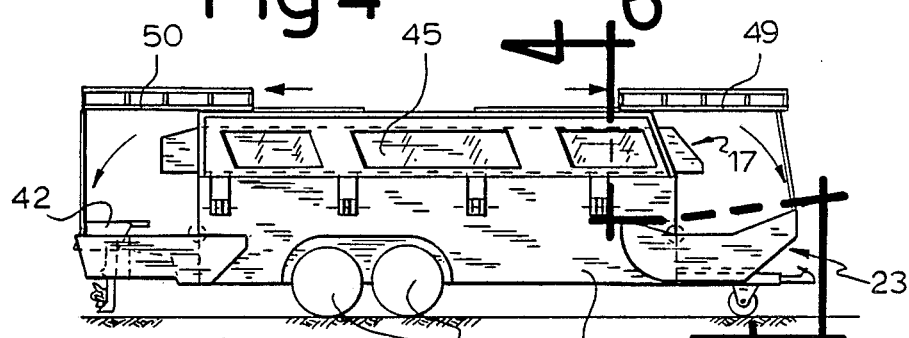
FIG. 5 is a side view of the house trailer and boat assembly with the end floats in lowered boat position.
Figure 7:
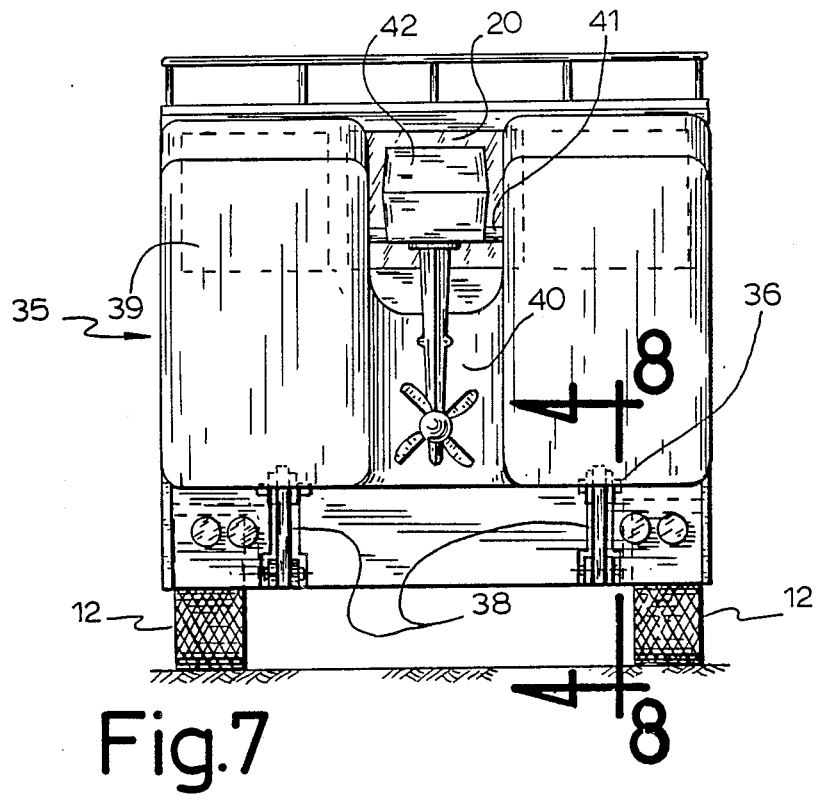
FIG. 7 is an elevation view showing the rear of the house trailer and boat assembly as seen in FIG. 4 looking in the direction of arrows 7.
Figure 8:
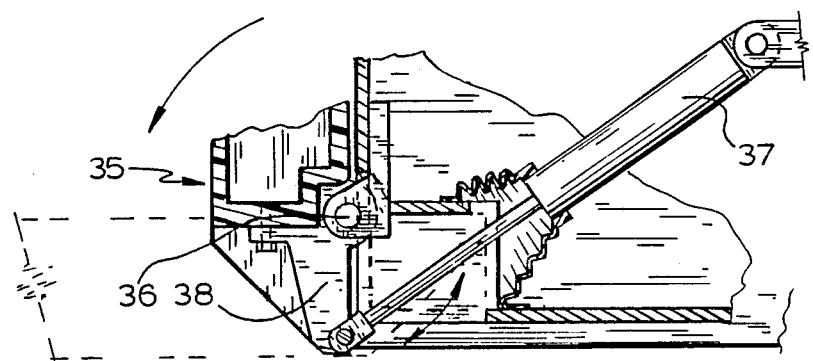
FIG. 8 is a detailed cross-sectional view as seen along line 8—8 in FIG. 7.
Figure 9:
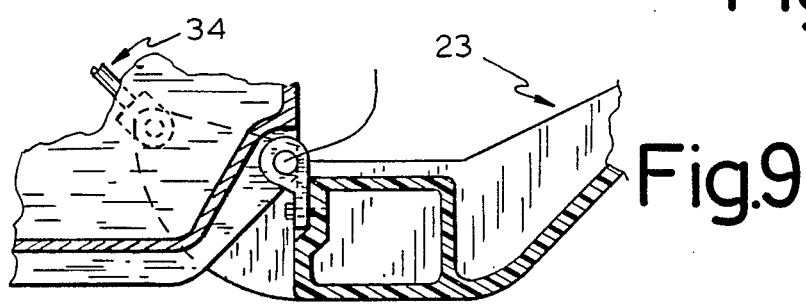
FIG. 9 is a detailed cross-sectional view as seen along line 9—9 in FIG. 6.

The rear wall of the house trailer box is similar to the front wall and it also includes a central door 20 only partly shown in FIG. 7. A rear float 35 is pivoted at 36 to the house trailer box by a pair of hydraulic actuators 37 connected to a pair of projections 38. The rear float 35 has an exterior surface 39 which forms a longitudinal recess 40. A pivot 41 extends transversely through recess 40. The pivot 41 carries an outboard motor 42 and allows pivoting of the latter between an inoperative travel position shown in FIG. 7 and an operative boat position shown in FIG. 5. In the travel position, the outboard motor is fully recessed in the longitudinal channel 40. The rear float 35 has its internal surface also formed with cavities, not shown, comparable to the cavities 31 of the front float, this time to provide spaces for the rear end of the lateral floats 17.

The flat roof 13 of the house trailer rests on central posts 43. A lateral panel 44 is pivoted along each lateral edge of the roof 13, as best shown in FIG. 6, and is constructed and arranged to close the longitudinal aperture between the roof and the corresponding side wall 11 and to upwardly pivot to allow entry of a corresponding lateral float 17 in the space inside the house trailer box. Each lateral panel 44 includes windows 45 as needed for the house trailer and house boat configuration. A pair of pivotable end panels 46 are provided at each end of the house trailer box and are arranged to upwardly pivot inward along the edge of the roof, as shown by the arrow in FIG. 5a. Each end panel 46 is provided with a window 47 and is positioned adjacent one lateral panel 44 such as to allow entry of the lateral floats in stowed position in the upper space defined by the house trailer box when the panels 44 and 46 are pivoted upward.

Figure 4:
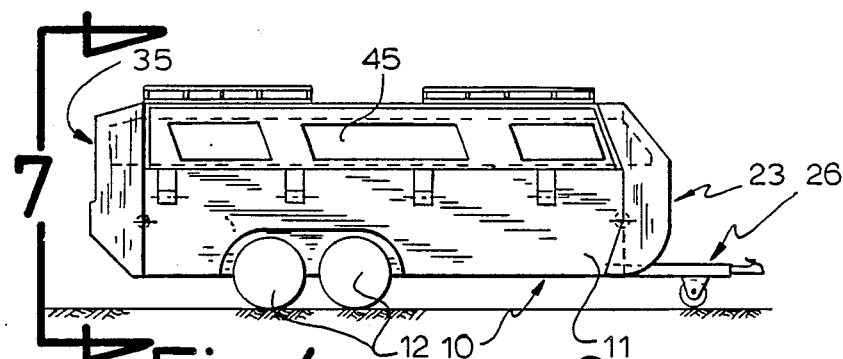
FIG. 4 is a side view of the house trailer and boat assembly in the trailer configuration.

Guide tracks 48 of any suitable type longitudinally extend on the roof 13 and lengthwise of it. A pair of roof deck panels 49 and 50 displaceably engage the guide tracks 48 to be movable fore and aft relative to the roof. The panels 49 and 50 form roofs over the rear and front decks defined by the end floats and they are connected to the latter through posts 51. Panels 49 and 50 are slidably displaced on the roof when the end floats pivot down between their travel position shown in FIG. 4 and their house boat position shown in FIG. 5. FIG. 6 illustrates the two extreme positions of the lateral floats 17; on the left side, the lateral float is shown in its elevated stowed and travel position in the space defined by the house trailer box and on the right side, the lateral float is shown in its lowered house boat position with pins 52 locking the arms 16 against the corresponding side wall of the house trailer box.

I claim:

1. A house trailer and boat assembly comprising an elongated house trailer box including a bottom, opposite lateral sides and a top cooperatively forming an internal space, each of the opposite lateral sides having an elongated aperture extending longitudinally thereof in communication with the internal space, a pair of elongated lateral floats extending along the opposite lateral sides of the elongated house trailer box and link means connecting the pair of elongated lateral floats to the elongated house trailer box and constructed and arranged for displacement of the floats between a lowered boat configuration outward of the house trailer box and a retracted position into the internal space defined by the house trailer box; at least one end float being attached at one end of the elongated house trailer box and operatively displaceable between a lowered float position and an elevated trailer position; and at least one roof panel mounted on the top of the house trailer box and operatively displaceable between an outwardly protracting position over one end float and an inwardly retracted position over the top of the house trailer box; wherein guide tracks are mounted on the top of the house trailer box and operatively extend lengthwise thereof and said one roof panel is mounted on the guide tracks and constructed and arranged for guided displacement along the latter lengthwise of the house trailer box.

2. A house trailer and boat assembly as defined in claim 1, wherein the one roof panel is linked to said one end float and is operatively displaceable therewith.

3. A house trailer and boat assembly comprising an elongated house trailer box including a bottom, opposite lateral sides and a top cooperatively forming an internal space, each of the opposite lateral sides having an elongated aperture extending longitudinally thereof in communication with the internal space, a pair of elongated lateral floats extending along the opposite lateral sides of the elongated house trailer box, link means connecting the pair of elongated lateral floats to the elongated house trailer box and constructed and arranged for displacement of the floats between a lowered boat configuration outward of the house trailer box and a retracted position into the internal space defined by the house trailer box; and front and rear end floats, attached at one end of the elongated house trailer box and operatively displaceable between a lowered float position and an elevated trailer position; said front float having an outwardly bulging external surface and being constructed and arranged to form a front house trailer and matching one end of the house trailer box; wherein an elongated lateral panel is pivotally connected to the house trailer box on each of the opposite sides thereof and is constructed and arranged to cover the corresponding elongated aperture, and panels are pivotally connected to the ends of the house trailer box and are constructed and arranged for pivotal displacement thereof between a vertically extending house boat position and an inwardly retracted position allowing the outward projection of the opposite ends of the lateral floats when the latter are in retracted position into the internal space defined by the house trailer box, and the end floats are formed with cavities allowing full enclosure of the lateral floats upon positioning of the lateral floats and end floats in the elevated trailer position thereof.

4. A house trailer and boat assembly as defined in claim 3, wherein the rear float is constructed and arranged to form a rear house trailer end matching the other end of the house trailer.

5. A house trailer and boat assembly as defined in claim 4, wherein the rear end float includes an external surface, the end floats and the external surfaces thereof are complimentarily shaped relative to the corresponding ends of the house trailer box to complimentarily form a substantial continuous skin therewith defining an aerodynamic house trailer shape.

6. A house trailer and boat assembly as defined in claim 5, wherein each end float is pivotally connected to the corresponding end of the house trailer box adjacent the bottom thereof and is constructed and arranged for pivotal displacement between the lowered float position thereof horizontally extending away from the house trailer box and an elevated trailer position upwardly extending against the corresponding end of the house trailer box.

7. A house trailer and boat assembly as defined in claim 6, wherein each float is formed with an upwardly facing deck surface relative to the lowered float position thereof.

8. A house trailer and boat assembly as defined in claim 6, wherein the lateral float have opposite ends outwardly projecting fore and aft respectively relative to the house trailer box and defining deck surfaces extending peripherally around the house trailer box cooperatively with the deck surfaces of the end floats when the floats are in lowered position.

9. A house trailer and boat assembly as defined in claim 8, further including a railing on the floats extending around the house trailer box outwardly of the deck surfaces and including disconnectable portions constructed and arranged for dismounting of the railing allowing pivoting of the floats to the elevated travel positions thereof.

10. A house trailer and boat assembly as defined in claim 3, wherein the rear end float is formed with a longitudinal recess formed in the external surface thereof, an outboard motor is operatively hinged to the rear end float and is pivotally displaceable between a lowered operative upright position with the rear end float in house boat position and an elevated stowed position into said longitudinal recess with the rear end in trailer position.

11. A house trailer and boat assembly as defined in claim 10, wherein the link means connecting the lateral floats to the opposite sides respectively of the house trailer box include hinges secured to said opposite sides intermediate the lowered boat configuration and the elevated retracted position of the lateral floats, and each of said hinges includes an arm having an outer end connected to the corresponding lateral float and constructed and arranged for translation of the latter between the lowered float position and the elevated retracted position thereof.

12. A house trailer and boat assembly comprising an elongated house trailer box including a bottom, opposite lateral sides and a top cooperatively forming an internal space, each of the opposite lateral sides having an elongated aperture extending longitudinally thereof in communication with the internal space, a pair of elongated lateral floats extending along the opposite lateral sides of the elongated house trailer box, link means connecting the pair of elongated lateral floats to the elongated house trailer box and constructed and arranged for displacement of the floats between a lowered boat configuration outward of the house trailer box and a retracted position into the internal space defined by the house trailer box; front and rear end floats attached at one end of the elongated house trailer box and operatively displaceable between a lowered float position and an elevated trailer position, with the front float having an outwardly bulging external surface and being constructed and arranged to form a front house trailer and matching one end of the house trailer box; said lateral floats being longer than the house trailer box and projecting fore and aft thereof; wherein said front float defines a top surface provided with a pair of cavities, for receiving the corresponding front ends of the lateral floats in said retracted position of the latter; and wherein said rear float also defines a top surface provided with a pair of cavities, for receiving the corresponding rear ends of the lateral floats in said retracted position of the latter.

13. A house trailer and boat assembly as defined in claim 12, further including latch means, to releasably lock the end floats to the lateral floats in said retracted position thereof.

* * * * *